United States Patent Office 2,919,287
Patented Dec. 29, 1959

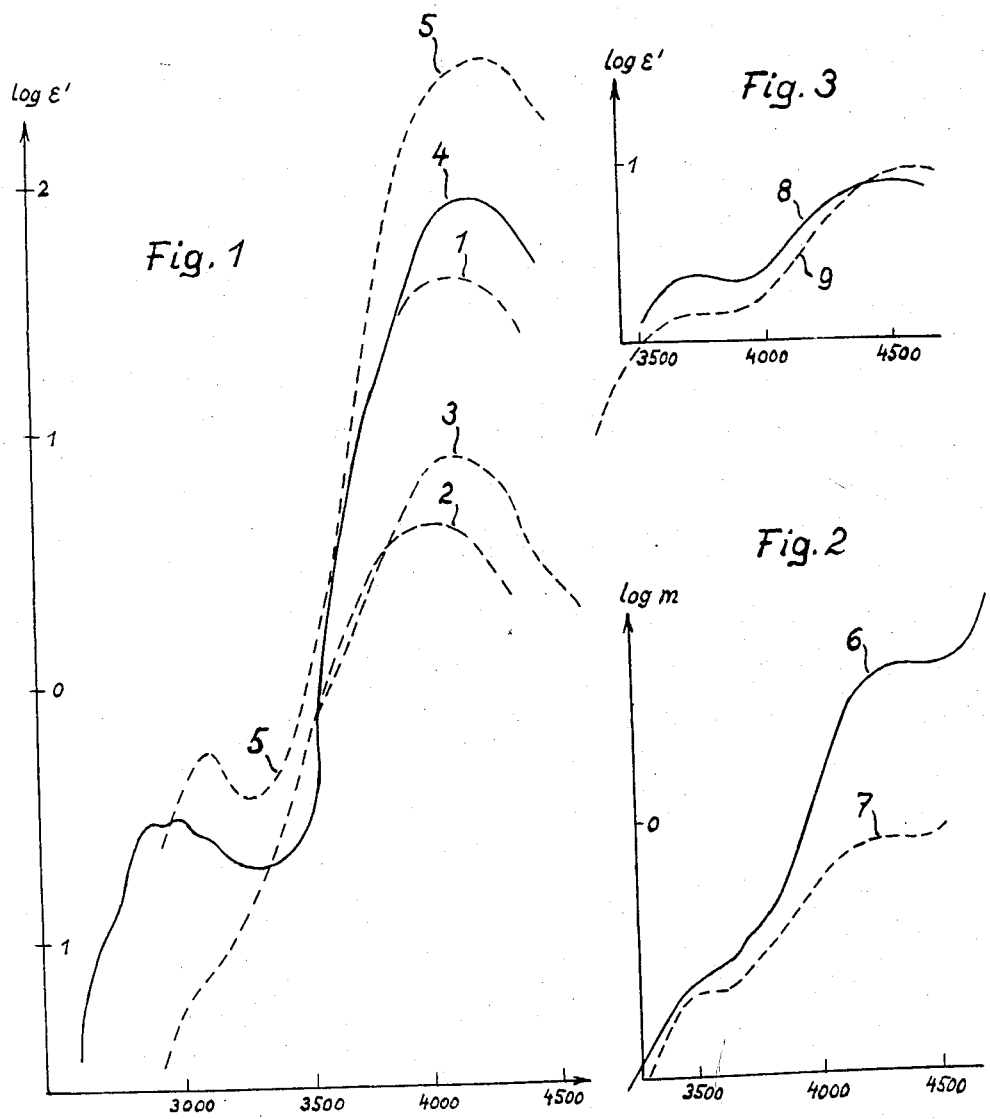

2,919,287

PROCESS FOR THE CONVERSION OF NORMALLY WATER-INSOLUBLE ORGANIC SUBSTANCES INTO WATER-SOLUBLE FORM AND SUBSTANCES PRODUCED BY SAID PROCESS

Erwin Schauenstein, Graz, Austria, assignor to Nitritfabrik Aktiengesellschaft, Feldkirchen, near Munich, Germany Application January 19, 1955, Serial No. 482,802

Claims priority, application Austria January 22, 1954

2 Claims. (Cl. 260—398)

This invention relates to a new and improved process for the conversion of normally water-insoluble organic substances into water-soluble form and to new organic substances produced by said process.

The insolubility of many organic compounds in water represents a serious obstacle, both to their further processing and to their application, especially in the fields of biology and medicine. In the case of many important pharamceuticals, application thereof in aqueous solution, which is most favorable biologically for resorption, e.g. by intravenous injection, has so far not been possible.

In some cases, a way out has been found by introducing hydrophilic groups, as for example, a polyoxymethylene derivative, into fatty-acid molecules. In this, however, a chemical change must be accepted as inevitable. The preparations made in this manner are known as twin-preparations. In other cases, aqueous emulsions have been made, for example of various fats, as well as of Vitamin A. Aside from the instability of their degree of dispersion, these emulsions by no means possess the resorption properties of true aqueous solutions.

The purpose of the invention is to permit true solubility in water of substances naturally not soluble in water, without any chemical changes. Surprisingly, it has been found that organic substances not soluble in water, which contain one or more double bonds, can be made soluble in a simple manner by bringing the non-soluble substances into close interaction with a multiple excess of water by mechanical means, and with avoidance of oxidation, whereupon the aqueous phase containing the soluble substance is separated from the remainder of the initial material. The process can be used to excellent advantage, for instance, for the conversion of water-insoluble unsaturated fatty acids, fatty-acid esters, ketones, and aldehydes, especially those with at least two conjugate double bonds and their derivatives obtained by substitution. The latter group of substances contains a number of substances of great biological importance, especially the so-called F-active fatty acids.

The invention permits completely safe intravenous application of such substances without any chemical change in the substance and without the necessity of forming emulsions. In their water-soluble form the substances can also be used for implantation therapy, in connection with water-soluble carrier substances. Similarly, highly effective percutaneous resorption of substances which so far could only be applied in water-insoluble form has been made possible.

The close interaction between the water-insoluble unsaturated substances and water can be accomplished, for instance, by stirring at a high rate. However, care must be taken that the stirrer is so designed and the r.p.m. (revolutions per minute) so chosen that the formation of bubbles and foam is avoided, in order to prevent oxidation of substances with double bonds during the processing. In general, stirring for 30 to 150 minutes at several hundred revolutions per minute of the stirrer will suffice. A great excess of water should preferably be used. A hundredfold excess has proved to be practicable, but a lower or higher figure may be chosen. In the latter case, however, a frequently undesirable dilution will have to be accepted.

In the processing of water-insoluble substances which are solid or viscous at room temperature, it is recommended that the process be carried out at a raised temperature at which the starting material will be sufficiently liquid.

In order to avoid any oxidation during the processing, water free of air is used. The process can also be carried out in an atmosphere of protective gas, e.g. nitrogen. In that case, the close interaction can also be brought about by shaking. Furthermore, all catalysts which encourage oxidation, such as heavy-metal ions, must be kept out.

By this process, both individual, water-insoluble, unsaturated compounds, as well as mixtures of such compounds, can be turned into a water-soluble form. If a mixture contains substances some of which can be made soluble in water by this process and others which cannot be made soluble because they lack double bonds, for instance, the process can be used to carry out a separation.

*Example I*

1 g. citrus oil is stirred with 400 g. (experiment No. 1) or, respectively, 10 g. (experiment No. 2) or, respectively, 100 g. (experiment No. 3) of freshly distilled water at room temperature for 30 to 60 minutes in a container with a ground-glass stopper. The emulsion is left in a separating funnel for 24 hours. The aqueous phases are separated and filtered through very dense filter paper.

Completely clear, colorless solutions with an intensive odor of citral are obtained. They show no Tyndall effect, and also contain no microscopically detectable oil droplets.

The ultraviolet spectrogram of the resulting aqueous solutions are represented in Figure 1 by the broken lines 1, 2, and 3. For comparison, the spectrum of the citrus oil used as starting material is shown by the solid line 4. It is seen that in all three experiments substances with the conugate unsaturated system C=C—C=O can be proved spectrographically. For comparison, the spectrogram of citral is also shown as the broken curve 5.

The quantitative determinations of the water-soluble oil quantities obtained in the experiments showed the following results:

| Experiment No. | Water-insoluble Portion, percent | Ratio, Oil:Water |
|---|---|---|
| 1 | 53.3 | 1:400 |
| 2 | 90.7 | 1:10 |
| 3 | 60.0 | 1:100 |

The water-soluble portion contains predominantly citral in water-soluble form as well as higher fatty acids in water-soluble form. In evaporating the water, citral evaporates with the water vapor. There remains a clear, glassy-amorphous dry residue consisting of higher fatty acids in water-soluble form. This residue is easily and completely dissolved in water.

However, if the aqueous solution is extracted with a fat solvent, such as ether or cyclohexane, the aqueous substances will go over into the solvent. After evaporation of this solvent, citral is obtained in a mixture with higher fatty acids, but no longer in a water-soluble form. The solubility in water has been lost by the dehydration.

Similar results were obtained in the processing of orange-peel oil, grapefruit-peel oil, sandalwood oil, and caraway oil. The spectrograms of water-insoluble sandalwood oil (line 6) and of sandalwood oil in water-soluble form (line 7) are shown in Figure 2.

*Example II*

A mixture consisting of linoleic acid, linolenic acid, oleic acid and a small portion of saturated fatty acids, obtained from pure linseed oil, was mixed with a hundredfold quantity of freshly distilled water and stirred for an hour at a temperature of 60 to 70 degrees centigrade. The separated aqueous phase was a molecular solution of conjugate fatty acid.

The pH, determined electrometrically, was 3.3 to 3.4, and shows the existence of a true aqueous solution of fatty acid. This finding was confirmed by electrometric titration of the aqueous solution. The titration curve gave a value for the electrolytic dissociation constant of the dissolved substance of $2 \times 10^{-5}$.

After evaporation of the water, a clear, bright-yellow, glassy-amorphous mass is obtained, which is soluble in water, although with difficulty. In aqueous phosphate buffer solution, it immediately goes into a clear solution of any desired concentration. The portions of the initial fatty-acid mixture to be obtained from the aqueous solution are between 2 and 13 percent of the quantity originally weighed.

In Figure 3 the solid line 8 shows the spectrogram of the initial material, while the broken line 9 shows the spectrogram of the aqueous solution. Both curves have the typical maxima of the double and triple conjugate unsaturated fatty acids of the type of 9, 11-linoleic acid and 9,11,13-linolenic acid.

Cryoscopic determination of molecular weight of the aqueous fatty-acid solutions yields higher freezing points. This indicates the presence of molecular compounds formed between the solvent and the dissolved substances.

The results of the experiments show that a simple addition of water of hydration at the double bonds probably takes place, which produces the solubility in water. Thereby, however, no saturation of the double bonds and introduction of hydroxyl groups into the molecule is effected. This is confirmed by the experience that the soluble form of the unsaturated compounds will again be reconverted to the original water-insoluble form by fat solvents without showing any chemical change in the substance.

Water additions to double bonds are known in principle, but so far they have been produced only under entirely different conditions. The present process is distinguished by the great simplicity with which solubility in water is obtained.

What is claimed is:

1. The process of producing water-soluble products from substantially water-insoluble organic compounds having at least two double bonds in their molecule and being selected from the group consisting of higher fatty acids, their esters, and aldehydes and ketones of ethereal oils, which process consists in agitating such a substantially water-insoluble organic compound having at least two double bonds in its molecule in the liquid state with a multiple excess of water nearly free of free oxygen and in the absence of catalysts, until part of said water-insoluble organic compound is dissolved in said water, and separating the undissolved water-insoluble organic compound from the aqueous solution.

2. The water-soluble water-addition product of a substantially water-insoluble organic compound having at least two double bonds in its molecule and being selected from the group consisting of higher fatty acids, their esters, and aldehydes and ketones of ethereal oils, said product, on extraction by a fat solvent selected from the group consisting of ether and cyclohexane and evaporating said solvent, leaving an evaporation residue consisting at least partly of said substantially water-insoluble organic compound.

References Cited in the file of this patent
UNITED STATES PATENTS 2,093,426    Dreyfus _____ Sept. 21, 1937

OTHER REFERENCES

Beilstein: Band 1, Zweites Erganzungs Werk, 1941, page 157.

Deuel-Lipids, vol. I, Chemistry (1951), pages 57 and 68, Interscience Publishers Inc., N.Y.C.